United States Patent [19]

Young

[11] 3,931,984

[45] Jan. 13, 1976

[54] ANTI-LOADING TRAY FOR SHOPPING CARTS

[75] Inventor: Norman Young, Okalahoma City, Okla.

[73] Assignee: Unarco Industries, Inc., Chicago, Ill.

[22] Filed: July 15, 1974

[21] Appl. No.: 488,730

[52] U.S. Cl. .......................................... 280/33.99 C
[51] Int. Cl.[2] .......................................... B62B 11/00
[58] Field of Search ............... 280/33.99 R, 33.99 A, 33.99 H, 280/33.99 S, 33.99 T, 33.99 F, 33.99 C, 36 B, 41 A, DIG. 4

[56] References Cited
UNITED STATES PATENTS

| | | | |
|---|---|---|---|
| 3,361,438 | 1/1968 | Davis | 280/33.99 R |
| 3,829,114 | 8/1974 | Cohen et al. | 280/33.99 R |

FOREIGN PATENTS OR APPLICATIONS

| | | | |
|---|---|---|---|
| 1,194,860 | 11/1959 | France | 280/33.99 H |

Primary Examiner—M. Henson Wood, Jr.
Assistant Examiner—David M. Mitchell
Attorney, Agent, or Firm—Norman Lettvin

[57] ABSTRACT

There is disclosed herein an anti-loading tray assembly, for mounting upon the lower frame of conventional nestable shopping carts, at a position below the basket so as to prevent pilferage by loading of articles onto the cart below the basket. The tray includes a plurality of interconnecting elongated struts, cross members of a size, shape and arrangement to define a forwardly-and-downwardly sloping, plane-like area with lateral wings which prevent loading of articles upon either the tray or lower frame of the cart. Simplified means of connection of the tray to existing structure of the cart's frame provides that the anti-loading tray may be an economical add-on feature. The arrangement provides a simple inexpensive tray which is easily manufactured and may be readily installed both at the factory and on existing carts in the field.

5 Claims, 3 Drawing Figures

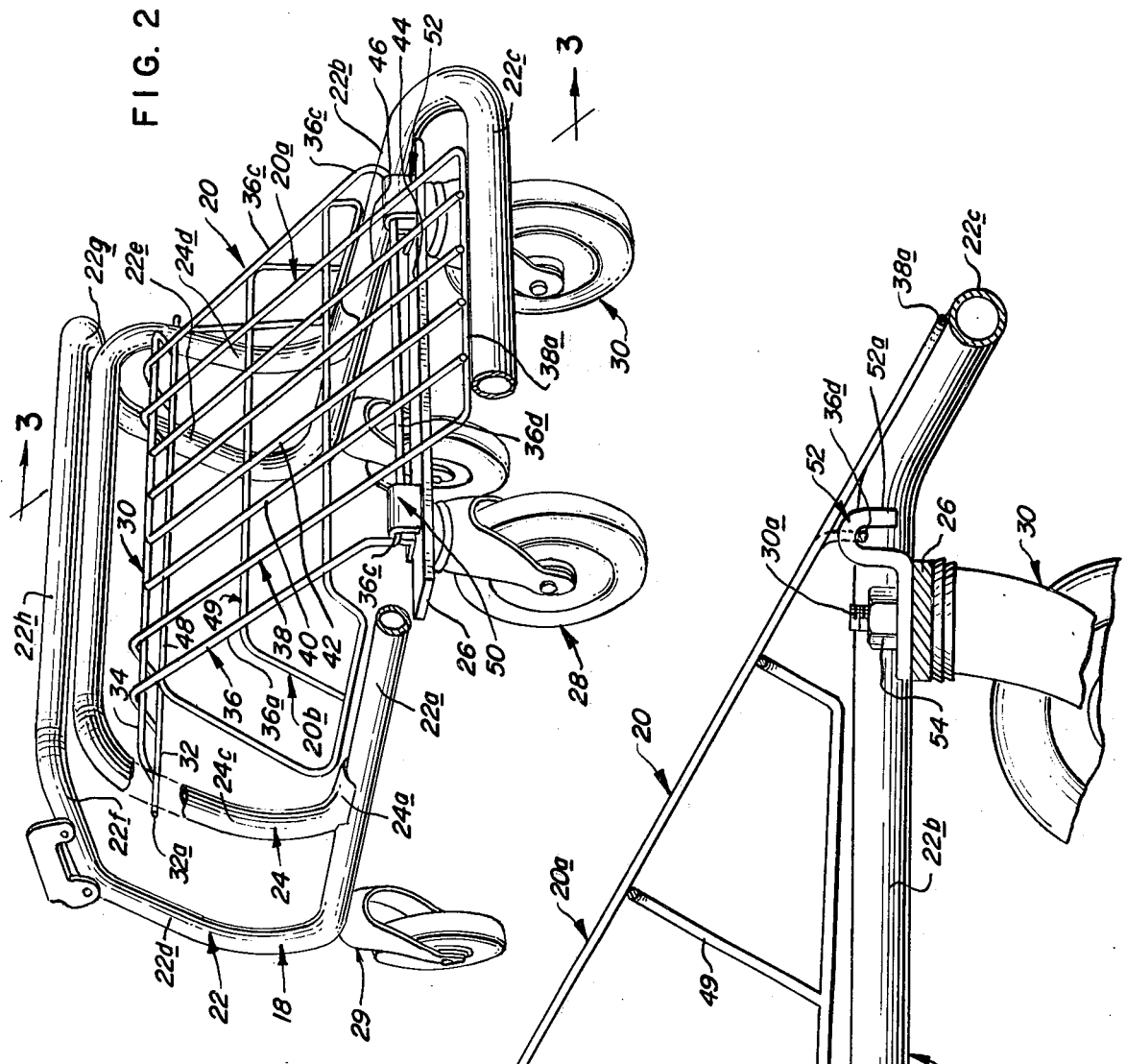
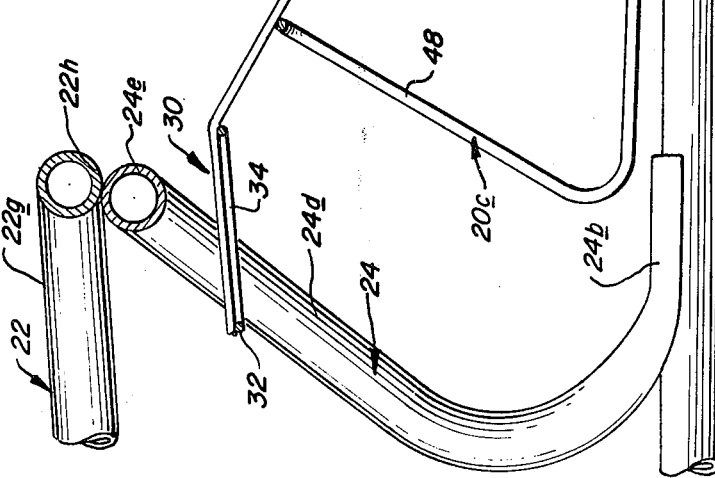

ANTI-LOADING TRAY FOR SHOPPING CARTS

BACKGROUND OF THE INVENTION

This invention relates to shopping carts and in particular to anti-loading trays for mounting on shopping carts.

It has been found that, in large supermarkets which use conventional nestable, or telescoping, shopping carts, substantial quantities of goods may be pilfered and not checked at the check-out station because they are carried out of the store on the cart frame at a position below the cart's basket. Often the goods below the basket are obscured from the view of the checker and thus, either intentionally or unintentionally, the goods are not checked through. The failure to check these goods has resulted in substantial losses to the supermarkets.

In order to prevent such losses it has long been suggested that an anti-loading device be positioned on the cart's frame below the basket. A construction has recently been disclosed wherein a plurality of bars are welded to the cart's frame and arranged to provide forwardly and laterally sloping planes that prevent loading of articles on the cart's frame below the basket. Such a device presents problems that: (1) carts already in use cannot be field-converted to use the device; and (2) special jigs and tooling may be necessary at the manufacturing plant in order to manufacture carts with the device.

It is, therefore, an object of this invention to provide an anti-loading tray device which is characterized by its simplicity of construction which permits connection of the unit to existing cart structures without welding thereby providing economy of manufacture and permitting conversion of carts already in use, as desired.

These and other objects of this invention will become apparent from the following description and appended claims.

SUMMARY OF THE INVENTION

There is provided by virtue of this invention an anti-loading tray (1) which can be fabricated as a subassembly and (2) which can be effectively and conveniently mounted on conventional carts already in use in the field, or economically installed during manufacture. The tray is formed from shaped, steel rods that are shaped and arranged to cooperate with existing cart frame structure and with simple clips which cooperate with the cart's forward cross-member that serves as the mounting for the cart's forward casters.

BRIEF DESCRIPTION OF THE DRAWINGS

FIG. 2 is an enlarged, fragmentary perspective view of the lower frame portion of a conventional nesting cart showing the anti-loading tray subassembly mounted on the cart's lower frame; and FIG. 3 is an enlarged side elevational and cross-sectional view taken substantially along line 3—3 of FIG. 2 and showing the subassembly mounted on the cart's frame.

DESCRIPTION OF THE PREFERRED EMBODIMENT

Figure 1:
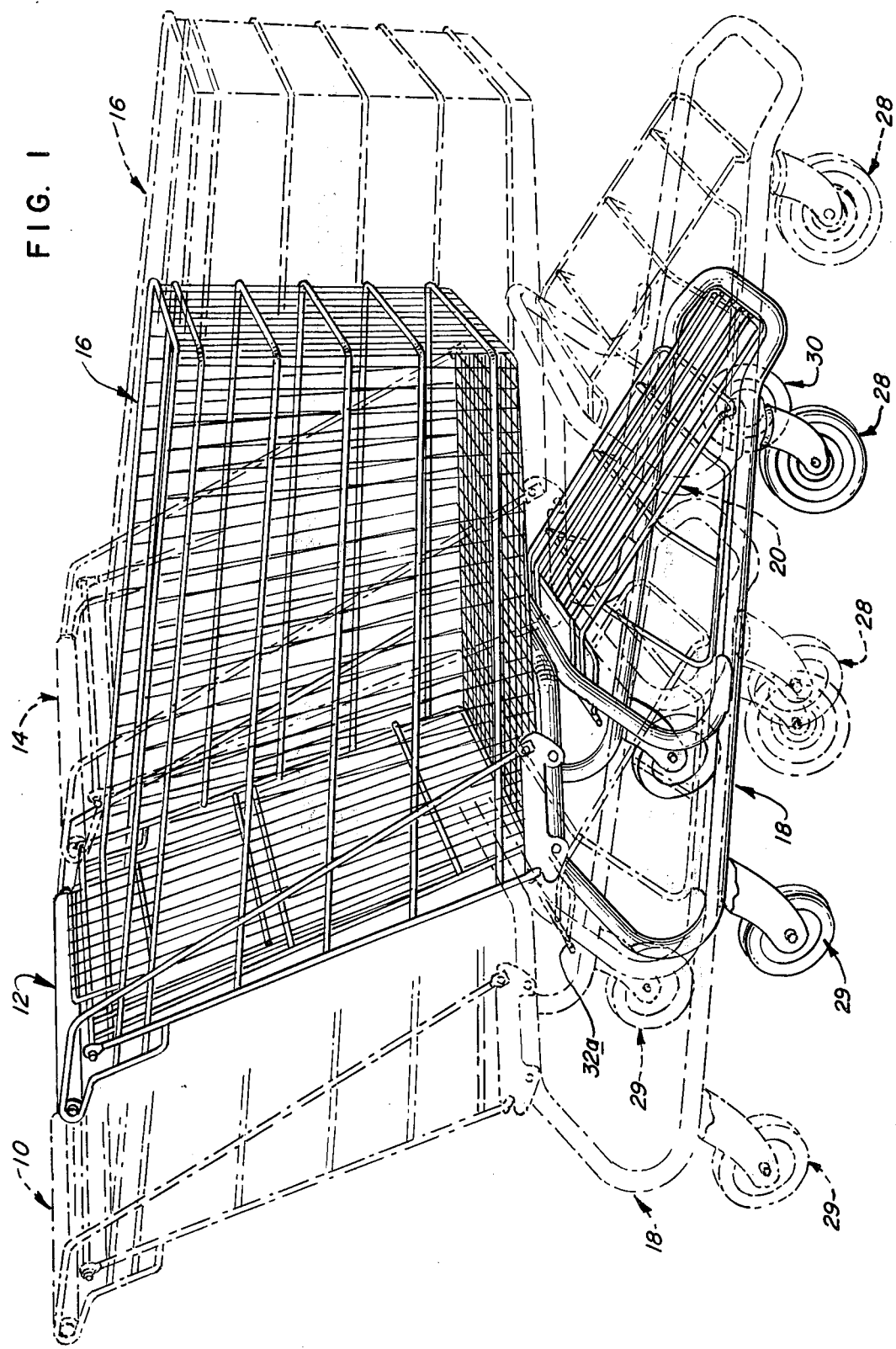
FIG. 1 is a perspective view showing three carts in nesting relationship, each of which has the anti-loading tray subassembly of this invention mounted thereon.

Referring now to the drawings, there is shown three shopping carts 10, 12 and 14 generally, each of which includes a lower frame portion, such as 18, upon which is carried a basket 16. An anti-loading tray subassembly, generally 20 is also carried by the lower frame portion of the cart below the basket.

The cart's lower frame is formed with a forwardly-tapered toe configuration and with an open back such that the front or toe end of one lower frame may move telescopically into nesting relation with another cart's lower frame, as is well known in the art. Each lower frame includes a main tubular frame member 22 which is generally C-shaped in side elevation and a front basket-brace member 24 which is also generally C-shaped in side elevation.

The main frame 22 is shaped from tubular steel and includes forwardly converging siderails 22a and 22b which continue and turn down to form a front end rail 22c. At their rear ends, siderails 22a and 22b turn upwardly to provide rear basket supports 22d and 22e which then turn forwardly and join to provide support siderails 22f and 22g and bight 22h which lie directly beneath basket 16.

The front basket support 24, which is also C-shaped in side elevation, is secured at each of its lower ends 24a and 24b to one of the siderails 22a and 22b, at a position intermediate the toe and heel ends of the cart's lower frame. At each side of the cart's frame the C-shaped portions 24c and 24d curve upwardly and rearwardly, as shown, and then turn forwardly to slope upwardly and to merge with a transverse bight 24e that engages the lower side of bight 22h to provide a rigidifying support or brace for the upper segment of the C-shaped frame member 22.

As well known in the art, the cart's frame is wheel mounted, so a forward cross-member 26 is secured to siderails 22a and 22b spaced rearwardly of the downturned toe end of the frame and from whence depend casters 28 and 30, while rear wheels 29 are appropriately secured to frame 22 adjacent its heel end.

The improved anti-loading tray 20 of this invention is fabricated as a subassembly from wire rod which is bent and welded to provide the desired shape. The tray is adapted for simple securement to the cart's frame by connection to the front cross-member 26 and for support on the forwardly and upwardly extending portion of the C-portion of the front basket support 24.

The tray 20 is shaped to provide a forwardly and downwardly sloping, lattice-type, plane-like area 20a which extends from an upper rearward position slightly below basket 16 to a lower forwardmost position adjacent the toe end of the cart's lower frame. Thus, articles placed on the plane-like area 20a will slide off thereby effectively preventing loading of articles onto that portion of the tray below the basket. Side wings 20b and 20c also extend downwardly from the lateral edges of the plane-like area to positions closely adjacent the siderails 22a and 22b of the cart for further preventing loading of articles onto those portions of the cart's frame below said planar portion of the tray.

The tray 20 includes an upper tray portion 30 for maintaining the rear end of the tray in the upper position, as shown, and for preventing transverse shifting of the tray. This tray portion 30 includes an elongated cross rod 32, and a transversely elongated U-shaped rod 34 whose greatest dimension is less than the length of cross rod 32. The legs of U-rod 34 are welded to the cross rod at points inwardly of the ends of rod 32 so as to locate the legs of U-rod 34 adjacent but between legs 24c and 24d while the free ends 32a are positioned to engage and be supported by the upwardly and rearwardly facing surfaces of the upper portions of upright brace legs 24c and 24d.

The plane-like area includes an outer U-shaped member 36 whose spaced legs 36a and 36c are bent and arranged to be welded adjacent their free ends to rod 32 and at intermediate points to the bight of rod 34 of the upper tray portion 30. Legs 36a and 36c project downwardly and forwardly as shown, and dip at elbows 36c to project downwardly and merge with bight 36d that serves as a cross bar especially adapted to be engaged by downwardly facing hooks carried on crossmember 26.

A second U-shaped member 38 is also provided, whose legs lie inwardly of the legs of outer U-shaped member 36 and are welded to the upper tray portion 30 and project forwardly and downwardly to pass above and forwardly of the cross-member 26 to merge with a bight that lies at a position closely adjacent and directly above the cart frame's toe bight 22c. Four elongated wires 40, 42, 44 and 46 complete the plane-like area 20a and are each welded at one end to the bight of U-rod 34 of upper tray portion 30 and at the other end to the bight 38a of U-member 38.

The side wings 20a and 20b are provided by transverse bent wires that are welded to the longitudinal wires of plane-like area 20a and includes a rod 48 which is formed into a generally trapezoidal loop-like shape. The loop-like rod 48 extends transversely across the lower portion of the plane-like area 20a and downwardly from the outer lateral edges of the plane area to adjacent the siderails 22a and 22b. At least one intermediate cross-rod 49 is also provided which is bent so as to extend substantially parallel to and between the parallel legs of the trapezoidal loop rod 48. The wing assembly consisting of loop 48 and cross-rod 49 is welded to the tray at the underside of the plane-like area so as to complete the tray subassembly.

As noted earlier, the rear end of tray 20 is supported through the ends of 32a of cross rod 32 engaging upright brace legs 24c and 24d. If the tray 20 has sufficient length, the bight 38a of U-rod 38 will engage and be supported by the frame's toe bight 22c. A positive hold down of tray 20 is provided by hook members 50 and 52, carried by cross-member 26, whose downwardly opening hook ends such as 52a embrace, and may even engage and draw down on, the bight 36d of U-wire 36. While hook members 50 and 52 may be independently connected to cross-member 26, preferably the mounting legs of such hook members are apertured to receive therethrough the threaded mounting studs 28a and 30a of casters 28 and 30, so that a single stud and nut, such as 54, serves the dual purpose of mounting a caster and a hook member that serves to retain the tray 20. The arrangement of hook ends, such as 52a, projecting forwardly of cross-member 26 whilst ends 32a of cross bar 32 are located rearwardly of brace legs 24c and 24b insures that the tray 20 may not be removed except by first removing hook members 50 and 52.

With the tray 20 in this position shown, any articles attempted to be placed on the tray will slide off the tray, thereby requiring that any goods, which are to be carried on the cart, must be stored in the basket 16 where they can be seen and checked by the cashier.

Furthermore, with this type of tray subassembly, nesting of carts is not inhibited since all of the various trays are held at the same attitude and do not interfere with each other or with parts of a nesting cart.

It will be appreciated that numerous changes and modifications can be made to the embodiment disclosed herein without departing from the spirit and scope of this invention.

What is claimed and desired to be secured by Letters Patent of the U.S. is:

1. In a wheeled nestable shopping cart of the type which includes a lower cart frame having toe and rear ends joined by side portions, a basket spaced thereabove, upright brace means spaced rearwardly of the lower cart frame's toe end and extending upwardly between the lower cart frame and basket, and means operatively associated with the lower cart frame to prevent loading of merchandise thereon, the improvement comprising, in combination, the upright brace means having a portion inclining forwardly and upwardly from said lower frame toward said basket, the lower cart frame including a transverse member adjacent the toe end of the cart, said means to prevent loading including a lower tray sub-assembly arranged to be selectively and nonpermanently attached to the cart and providing an upper surface extending substantially between said lower cart frame and said basket at an angle relative to the horizontal such as to prevent storage of articles thereon, the lower tray sub-assembly having rearward and forward elements arranged respectively to lie above and against the forwardly inclined portion of the brace means and said transverse member of the lower cart frame, and hook means adjacent the toe end of the lower cart frame arranged for restraining a portion of the lower tray sub-assembly for limiting rearward and upward movement of said lower tray, the hook means restraining an intermediate portion of the lower tray between said rearward and forward elements to maintain said rearward and forward elements against their respective supports.

2. A construction as in claim 1 wherein said lower cart frame includes a forward cross-member and two front casters secured through upstanding studs to said forward cross-member, and said hook means being connected to the studs for said front casters.

3. A construction as in claim 1 wherein said transverse member of the lower cart frame lies at a level below the level of the forwardly inclined portion of the upright brace means, and the lower tray being shaped and arranged to provide an upper plane surface that inclines forwardly from rearward to forward end thereof.

4. A construction as in claim 3 wherein the lower tray includes integral depending wing portions at the lateral edges of the forwardly inclined plane surface that extend down to adjacent the side portions of the lower cart frame to block lateral entry to the region between said inclined surface of the tray and the side portions of the lower cart frame below said inclined tray surface.

5. A construction as in claim 1 wherein the upright brace means include laterally spaced legs, the lower tray sub-assembly having a portion generally of a width to enter closely between said laterally spaced legs and to cooperate with said legs to restrain said tray from lateral movement relative to the lower cart frame, a part of the tray being of a width greater than the spacing of said legs and serving as the rearward elements that are positioned to engage the legs to restrain the tray from longitudinal forward movement relative to the lower cart frame and to hold one end of the tray elevated relative to other portions of the tray, and the hook means engaging depending elements of the tray to restrain the tray from rearward longitudinal movement relative to the lower cart frame and to hold the tray inclined forwardly and downwardly relative to said elevated end of the tray.

* * * * *